United States Patent [19]

Judith

[11] 3,832,694

[45] Aug. 27, 1974

[54] PROCESSOR UNIT FOR DATA RETRIEVAL AND PROCESSING

[75] Inventor: Vincent J. Judith, Southampton, Pa.

[73] Assignee: Excello Corporation, Detroit, Mich.

[22] Filed: Aug. 31, 1972

[21] Appl. No.: 285,237

[52] U.S. Cl. .............................................. 340/172.5
[51] Int. Cl. ......................... G08c 15/00, H04j 3/00
[58] Field of Search .................................. 340/172.5

[56] References Cited

UNITED STATES PATENTS 3,426,330 2/1969 Marx et al. ...................... 340/172.5

*Primary Examiner*—Raulfe B. Zache
*Attorney, Agent, or Firm*—Dorfman, Herrell and Skillman

[57] ABSTRACT

A data retrieval and processing system relies upon a center multiplexor and a memory address multiplexor in a system of registers and data processing means to both feed and receive both process information and operational data using internal programming stored within at least one memory and simple input control words and data, in response to which the center multiplexor provides internal switching between said aforementioned sources to provide information output. Priority selection is provided in servicing terminals and gives immediate exclusive attention and direct memory access to a particular urgent need exhibited through a selected control electronics.

8 Claims, 12 Drawing Figures

PATENTED AUG 27 1974 3,832,694

SHEET 3 OF 7

PATENTED AUG 27 1974 3,832,694

SHEET 7 OF 7

PROCESSOR UNIT FOR DATA RETRIEVAL AND PROCESSING

The present invention relates to a computer system employing a central processing unit (CPU) which is an eight bit, byte oriented micro-programmed computer, designed primarily for use in teleprocessing applications. The combination of the functional, mechanical and electrical design of the computer results in a system which can be easily tailored to meet many specific application requirements. The design concepts embodied in this CPU provide a unique combination of features not available in other small teleprocessing systems.

Microprogramming relates to the more detailed steps performed in the computer of the present invention. Microprogramming is accomplished by sets of commands, many of them being pre-established routines, that exert powerful microcontrol over the machine's data manipulation paths and functions. Command sequences which form microprograms are stored in high speed memory (HSM) or read only memory (ROM). The CPU of the present invention can be programmed either to emulate instructions of general and special purpose computers or to perform specific applications. A 1.8 microsecond core memory cycle time and a 200 nanosecond command execution time permits rapid emulation of macro-instructions which can be used to minimize interface hardware by applying the speed of the machine to interface functions.

Computers of the present invention are low cost units, versatile enough to perform a wide range of communications, industrial and business computation. These highly modular units, when coupled with appropriate input/output (I/O) devices provide a complete system solution to most information processing problems. The method by which the I/O devices are interfaced is determined by the speed and sophistication of the system application. Foremost in the interface design is the need to provide ease of use by others, the critical factor of human engineering, in conjunction with design simplicity and cost. To further ease interface operation and use, all timing for the interface is generated by the CPU.

The control electronics unit (CE) connected to a CPU may be a single device CE or a multiple device CE, depending on the system requirements.

The modular electrical and mechanical design of the CPU affords the flexibility needed for its application to a wide range of uses. A building block design is applicable to the core memory, read-only memory, processor options, and input/output elements allowing repeatable printed circuit boards to permit expansion of the system are required. Modern circuit techniques permit compact enclosures with spare circuit board slots and ample power for system and peripheral interfaces. The use of TTL monolithic intergrated circuits, including a large number of the medium scale integration type, account for low cost by providing savings in parts and assembly time. The use of read only memory (ROM) for control further reduces the number of circuits that might otherwise be required to provide the same functional capability. Packaging and power has been designed for small "micro" systems resulting in a savings in system cost.

More specifically the present invention relates to a data retrieval and processing system having a central processor unit, input and output control electronics interconnected to and for obtaining access to and output from the central processor unit and device controllers and control devices providing input to, and interconnected to output from the system. In this system the central processor unit provides the following components: a center multiplexor; at least one memory storing command sequence, access to which is gained through the center multiplexor and output of which is fed to the center multiplexor; a control word address register controlled by the center multiplexor for addressing the control words in memory; a control word register controlled by the center multiplexor for obtaining status of and decoding words in memory a memory address register controlled by the center multiplexor through which data addressing of memory is performed; a memory address multiplexor through which the control word address register and control word register obtain access to or supply data to said at least one memory; a data register for retaining data received through said center multiplexor and intermediate said at least one memory and a recycling path to the center multiplexor or input/output control electronics; and data processing means for performing arithmetic and other operations upon input and memory stored data. The center multiplexor both feeds and receives inputs from said at least one memory, each of the aforesaid registers and the input and output control electronics, whereby, using internal programming stored within said at least one memory and simple input control words and data, said center multiplexor will provide internal switching between said respective aforementioned sources to provide information output.

For a better understanding of the present invention reference is made to the following drawings in which FIG. 1 is a schematic block diagram of the overall computer of the present invention showing device controls at remote local terminals acting through central electronics to cooperate with a central processor unit;

Figure 1:
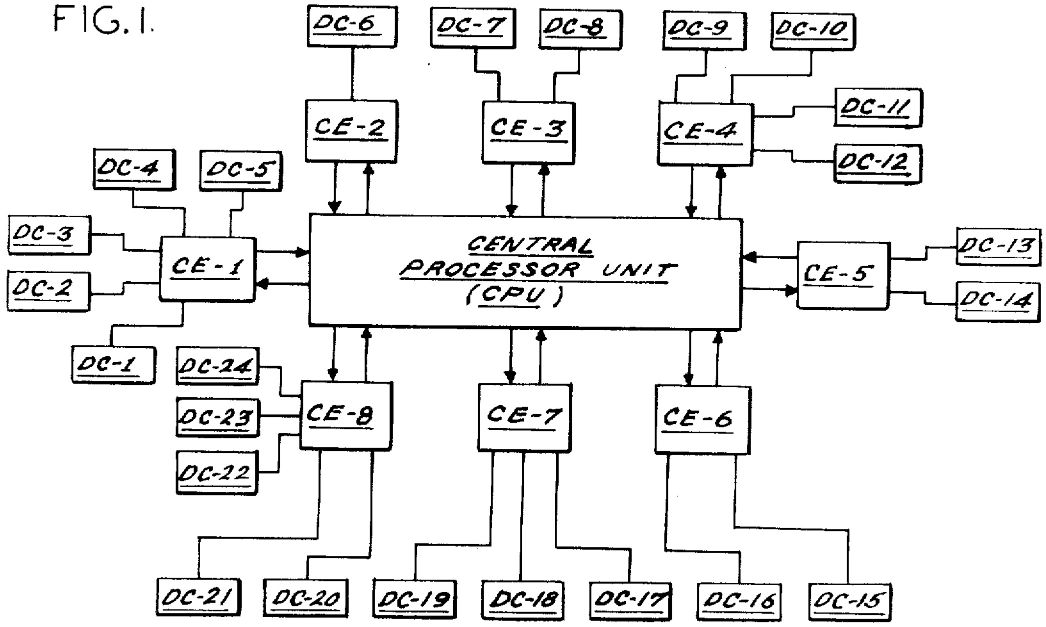

FIG. 1 illustrates a typical computer arrangement in accordance with the present invention. In this embodiment a central processor unit (CPU) is fed by and, in turn, feeds eight different control electronics devices CE–1, CE–2, CE–3, CE–4, CE–5, CE–6, CE–7, and CE–8. As can be seen the number of device controllers varies from one control electronics to another. CE–1 has five device controllers DC–1, DC–2, DC–3, DC–4 and DC–5. These may be any of the typical input/output (I/O) devices which are standard and known in the art or which may be hereafter conceived. For example teletypewriters may by proper controls serve both as input and output means. Tape readers and card readers constitute common input devices, while tape or card punches and printers constitute typical output devices. At some terminals but a single I/O device, such as a teletypewriter may be used as in the example shown where DC–6 is the sole input and output of CE–2. In the embodiment shown CE–3 has two device controllers DC–7 and DC–8; CE–4 has four: DC–9, DC–10, DC–11 and DC–12; CE–5 has two: DC–13 and DC–14; CE–6 has two: DC–15 and DC–16; CE–7 has three: DC–17, DC–18 and DC–19; and CE–8 has five: DC–20, DC–21, DC–22, DC–23 and DC–24.

Figure 2:
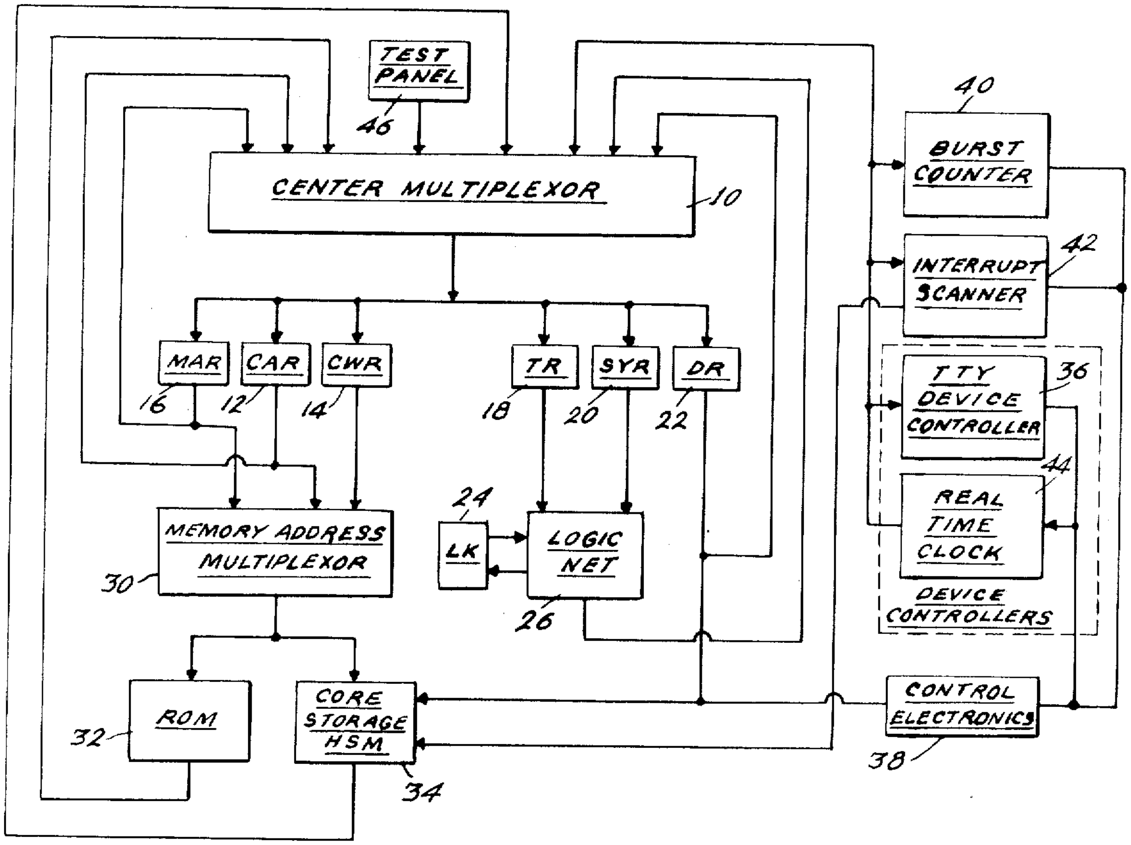
FIG. 2 shows in schematic form the relationship of the various registers, multiplexors and logic units of the central processor unit and to representative control electronics.

FIG. 2 illustrates the central processor unit (CPU) with a pair of local device controllers.

The CPU of the present invention is a high speed, byte oriented, micro-programmable computer plus for teleprocessing applications. It is a parallel, binary, fixed point, signed arithmetic unit, with hardware byte concatenation capability. Its word length is 8 bits plu parity. It employs a clock rate of 5.0 MHz. Instructions are within the following times:

| | |
|---|---|
| a. Add or Subtract | 2.0 microseconds |
| b. Register Change | 2.0 microseconds |
| c. Operate | 2.0 microseconds |
| d. Input/output from DR Register | 2.0 microseconds |
| e. Block input/output from memory (Maximum Block I/O Date Rate) | 2.0 microseconds |

The CPU employs two memories. One is a magnetic core memory and the other a read-only memory, each giving a capacity of 32,000 words storage. It also employs numerous registers as described above both for instructions and data handling. The CPU employs five basic types of control instructions employing 95 basic instructions with permutations. The five basic types are memory reference, input/output, register change, control and skips. Direct and program relative addressing modes are provided.

The CPU comprises a variety of registers for various functional purposes described as logic control means, inputs and outputs from memory, a device controlling multiplexor and various interconnecting paths. The CPU interfaces with the memory and each of the control electronic units (CE's) as seen in FIG. 1. The CPU retrieves and executes control word sequences from memory. The CPU contains a teletype buffer for test or console operation purposes, and a real-time clock.

CPU ELEMENTS

FIG. 2 depicts the internal organization of the Central Processor Unit (CPU). Central Multiplexor 10 is a scanning or strobbing switch through which all data paths are funnelled and which serves to sample each of the data line inputs in predetermined sequence in order to provide a single output at successive times. The central multiplexor has outputs through six registers which directly or indirectly feed back into the central multiplexor. The control word address register (CAR) 12 is used to retrieve control words from memory. In the control word register (CWR) 14 control words are staticized and decoded. Data addressing of memory is performed by memory address register (MAR) 16. Addresses and counts from memory, MAR 16, or CAR 12, which registers also have paths directly to the center multiplexor 10 alternative to those through the memory multiplexor to the memories, are incremented in the temporary register (TR) 18. The symbol register (SYR) 20 holds an operand to be added, subtracted or compared. TR 18 and SYR 20 feed a logic network 26 which performs predetermined arithmetic and logical operations on data received in accordance with programmed instructions. A one bit link register (LK) 24 operating on the logic network 26 holds a carry/borrow count from a previous operation associated with TR 18 and SYR 20. Data to and from memory, and data to and from the input-output (I/O) control electronics 38 are temporarily placed in data register (DR) 22.

CAR 12, CWR 14 and MAR 16 act upon memory address multiplexor 30 which selects appropriate memory blanks. Two types of memory are used. Read only memory (ROM) 32 stores the control word sequence for initial load or other micro-programs. Core storage or other high speed modifiable memory (HSM) 34 stores data or temporary program information. Both memories feed their outputs back through the center multiplexor 10.

A few inputs to the system through the center multiplexor are shown by way of example, to represent device controllers or to memory as data input. Teletypewriter (TTY) 36 is used to input, or can receive (through a conventional system not shown) and print out output data from the memory registers, for programming or test purposes. Auxiliary devices also act upon the center multiplexor 10 directly or through control electronics 38, or are acted upon by the center multiplexor. Burst counter (BC) 40 is an 8 bit counter which controls termination of the burst instruction and operates through the control electronics (CE) 38, which, in turn feed the center multiplexor 10. The interrupt scanner 42 is an 8 point time sequential scanner which examines the REQ and TERM lines from the control electronics (CE). The real time clock 44 is pervasive in the system giving reference to pulse sequences and the like.

Figure 3:
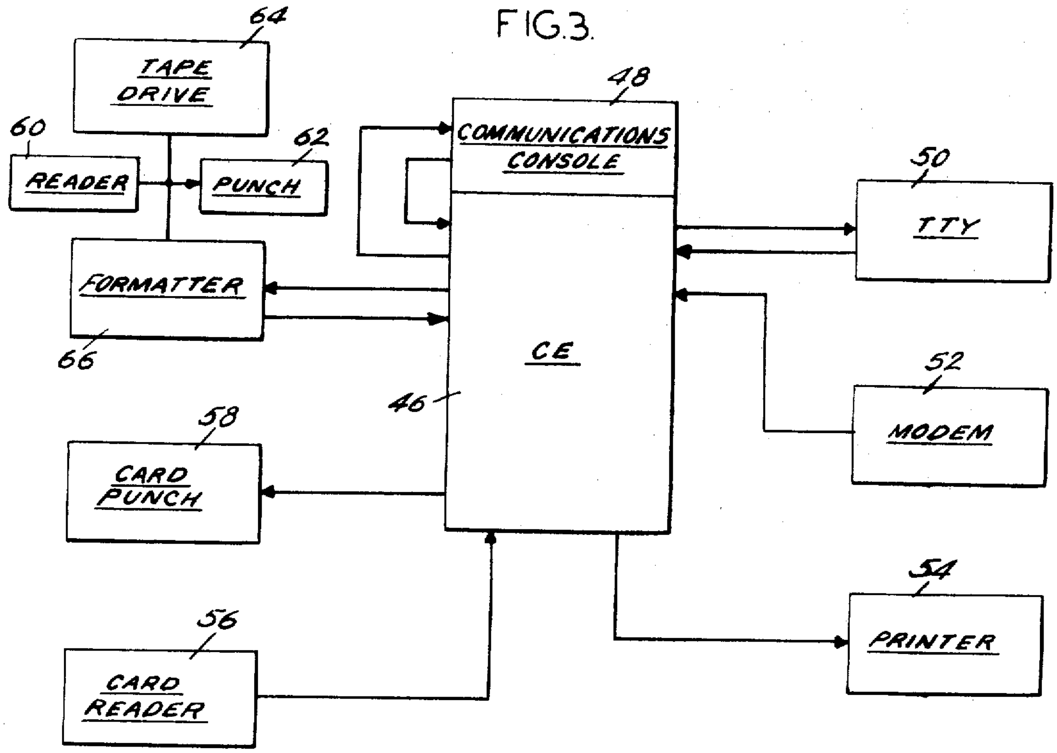
FIG. 3 is a representative schematic diagram showing the relationship of typical device controllers to a particular control electronics.

FIG. 3 is a block diagram schematically representing a control electronics (CE) 46 with a plurality of device controllers (DC's) as suggested by FIG. 1. Here a communications console 48 may be included directly as part of the CE 46 or as a separate piece of equipment connected to it. The console 48 may supply switch inputs and may have indicator outputs such as lights, meter dials and the like. Input or output capability is available from the teletypewriter (TTY) 50. Various types of modems 52 may be employed with further output or communication with remote terminals for input or communication with remote terminals for input to or output from the CE 46. Output may be had at a printer 54. Input from a card reader 56 and output to a card punch 58 provide complementary device controllers. Input from reader 60 and output from punch 62 both associated with tape drive 64 and formatter 66 provide both input and output in a somewhat complex system components together constituting a device controller.

CONTROL WORD OPERATION

Instructions for the CPU are called "control words" (CW's). The control word is an 8 bit binary word retrieved from either core storage (HSM) 34, or read-only memory (ROM) 32. The control word functions in this case are more elementary than those instructions found in conventional computers; therefore, they are given a different name.

The following registers are available to provide their stated capacity to the programmer:

Memory Address Register (MAR) 16: 16 bits;
Control Word Address Register (CAR) 12: 16 bits;

Control Word Register (CWR) 14: 8 bits;
Temporary Register (TR) 18: 12 bits;
Symbol Register (SYR) 20: 8 bits;
Data Register (DR) 22: 8 bits; and
Link Register (LK) 28: 1 bit.

Figure 4:
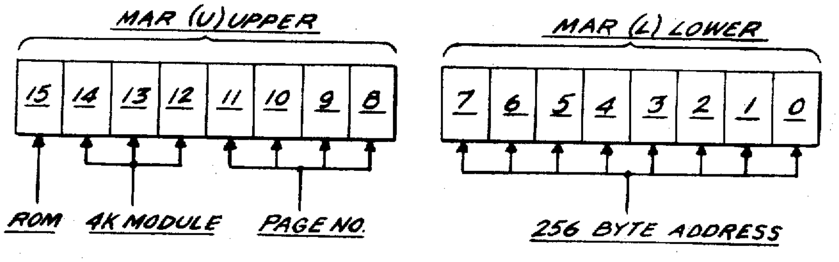
FIG. 4 is a schematic representation of an address register in the central processor unit.

MAR 16 addresses read-only memory (ROM) 32 or core storage (SM) 34 through memory address multiplexor 30 for data. Control words using memory data must have an address in MAR. The nature of this address is seen in FIG. 4 which shows how MAR's 16 bits are used. This amounts to two bytes since there are eight bits to the byte. The upper four bits are the memory module select bits. The most significant bit of these four selects the ROM module. The next three in combination select locations in the 4,000 bit memory core storage (HSM).

From an addressing point of view, the entire core storage memory is a set of contiguous locations whose addresses range from zero to a maximum dependent upon the capacity of the particular installation. In a system with the greatest possible capacity, the largest address is decimal 32,767. The core storage (HSM) 34 memory has a 1.8 microsecond full cycle. It is actually made up of a number of core memory modules, each having a capacity of 1,024, or 4,096 words.

In addition to core, there can theoretically be 32,000 words of ROM storage; however, it is not likely that the occasion for 32,000 words of core and 32,000 words of ROM would arise in a system application. The practical ROM limit has been set at 4,096 bytes of storage, which may be used for storage of permanent and unalterable programs and data constants, which may be of any size. ROM has a cycle time of 30 nanoseconds.

Again referring to FIG. 4 a MAR address supplied by the program is actually decoded in two parts, the more significant upper part (U) to select a memory module and the less significant lower part (L) to select a location within that module. This need not concern the programmer, from whose point of view, memory module size is irrelevant, and the read only memory differs from core memory only in that it is faster and its contents cannot be altered electrically. Common arithmetic and in-out routines are commonly used in standard read only memory modules; others are available on a custom basis depending upon the need of a given system.

Referring again to FIG. 2 CAR 12 is used to fetch control words from memory. It may be loaded by the interrupt scan counter 42, jump instructions, or from the test panel 46, which is used to check out proper operation of the central processor unit. At JUMP execution time, MAR bit position 12–15 are loaded into CAR bit positions 12–15 to facilitate control transfers to various memories. CWR 14 is used to hold the control word to be executed by the CPU. CAR 12 fetches control words to be placed in this register.

SYR 20 is used to hold an operand to be added, subtracted, or compared. It also controls termination of the burst input-output (I/O) instructions. DR 22 is used to hold data to be added, subtracted, shifted, or rotated. Data bytes to or from memory and data bytes to or from the device control electronics may also appear in DR. During execution of PROCESS, which controls the arithmetics, DR holds one of the operands at the initiation of PROCESS as well as the 8 kit result at the conclusion of PROCESS. DR is also the principal, if not the only, input/output register and through it moves all data and instructions passed out to the control electronics.

The twelve bit long temporary register TR 18 is invisible to the programmer. It is used for temporary storage of addresses to be incremented and one operand during execution of a PROCESS COMMAND.

The one bit link (LK) register stores the carry/borrow result of an arithmetic operation when a PROCESS command is executed.

MEMORY - PAGE LOCAL GENERAL REGISTERS/COUNTERS

The CPU's effectiveness is due in part to the ability to index the DR 22 from page local general registers (GR). Each memory page contains 16 GR locations at the beginning of the memory page. These GR locations may be addressed as normal core memory locations in the conventional manner but, more importantly, they are accessible directly with register load, store and increment control words.

The ability to manipulate 16 GR's per page when coupled with the CPU's bit addressing capability (SET bit, RESET bit, SENSE bit) enable powerful logical functions to be performed with minium usage of core space.

Functions such as the setting or resetting of FLAG bits in a FLAG byte, up-dating memory addresses for I/O, or providing temporary storage for arithmetic or logical operations is effective and an easy way to implement using core local General Register/Counters.

For Input/Output (I/O), register change, control and skips, two addressing modes are used, to wit: direct and program relative. I/O switch involves data transfer, interrupts and logic data transfer employs a program control using a single word to or from data register (DR) 22 either unconditional or conditioned on sense or data request response. Input to DR is not seen by the programmer. Automatic block transfer to or from memory in BURST MODE occur at up to 500,000 bytes per second. The BURST MODE makes it possible for every channel to be operated as a DMA channel.

The system includes an interrupt request system, which can be controlled by micro-commands. I/O interfaces are designed for generating service interrupts for data transfer, termination interrupts and external interrupts.

DATA FORMATS

Binary information in the system of the present invention is expressed in hexadecimal notation (base 16). Four binary bits of information can be expressed by a single hexadecimal digit. Thus, byte information can be expressed by a string of two hexadecimal digits. The following table illustrates preferred hexadecimal notation for use in the system of the present invention.

| HEXADECIMAL | BINARY | DECIMAL |
|---|---|---|
| 0 | 0000 | 0 |
| 1 | 0001 | 1 |
| 2 | 0010 | 2 |
| 3 | 0011 | 3 |
| 4 | 0100 | 4 |
| 5 | 0101 | 5 |
| 6 | 0110 | 6 |
| 7 | 0111 | 7 |
| 8 | 1000 | 8 |
| 9 | 1001 | 9 |
| A or: | 1010 | 10 |
| B or; | 1011 | 11 |
| C or < | 1100 | 12 |
| D or = | 1101 | 13 |
| E or > | 1110 | 14 |
| F or ? | 1111 | 15 |

Since binary addresses are cumbersome to work with, the hexadecimal numbering system provides an efficient man-to-machine interface for data.

ARITHMETIC FORMAT

Figure 5:
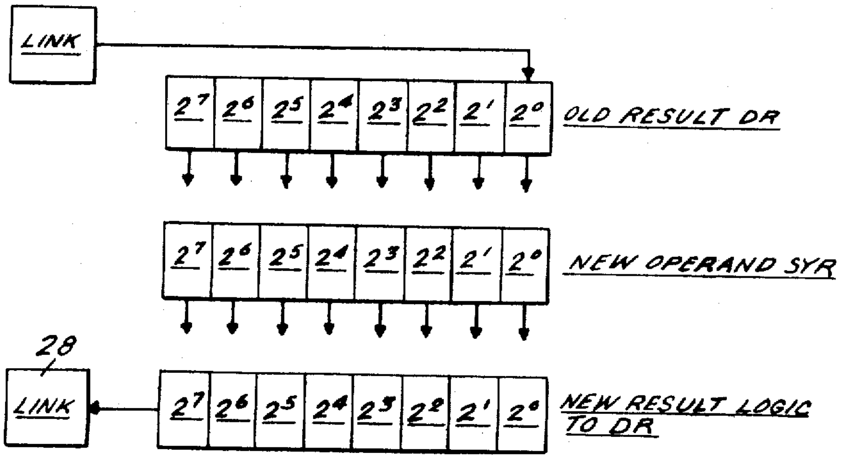
FIG. 5 is a schematic representation of the arithmetic section of the central processor unit.

The present invention preferably employs an 8 bit adder for binary data arithmetics as schematically represented in FIG. 5. The machine treats the most significant bit not as a sign, but as an operand. In the present system the carry/borrow result of an add or subtract operation is stored in a separate 1 bit link register (LK) 28. As seen in FIG. 5 the LINK bit from a previous operation may be added into a current operation as recorded in a register to provide multiple byte arithmetics. In a substract operation, a correct difference results when LINK is set, but an incorrect difference results when link is reset. In the latter case, the two's complement must be taken to obtain a correct result. Normally the operations required are invisible to the programmer.

The arithmatic format saves hardward and facilitates multiple byte operations; however, it adds to the burden of programming.

MICRO-CODE PROGRAMMING

The key to programming the computer of the present invention is control words (CW's). The general nature of CW's must be considered first before considering the special effects of the in-out CW's when they address secific peripheral devices. Memory reference instructions and the arithmetic and logical instructions are important in a general discussion of input-output, and the effects of the I/O instructions through CE's to processor elements and the real time clock will be described. Effects of I/O instructions on peripheral devices will be discussed in connection with those devices.

The computer is started in conventional manner using general reset and start procedures. A start button may be depressed to initiate execution of control word streams in memory. The first control word executed is retrieved from read only memory (ROM). ROM routines sense panel program switches to determine which routine to enter. Usually, the routine is in core memory (HSM), where control is automatically transferred, but control could be passed to a ROM Routine in some applications. Normally, HSM routines initiate and I/O control electronics (CE) by issuing command bytes via SEND COMMAND (SNC) Control Words.

Control word bytes for the I/O CE's are decoded in the CE unit. Control word bytes are 8 bit bytes which have significance only to the CE.

Some of the I/O CE's are bi-directional, that is, they may either read or write. If this is the case, then during initiation of the control electronics, a memory switch or flag must be set up for use during the service routine. The service routine senses the indicator to decide whether to issue a send (SND) or receive (RCD) instruction. For example, the teletypewriter (TTY) CE uses bit 1 (i.e., $2^1$) of the command byte to indicate a "send." Only when bit 1 is reset (zero) is input accepted from the TTY keyboard or reader.

When all control electronics are initiated, and no internal processing is to be done, a CON 6 control word is issued. This places the system in the control word idle mode. This mode halts the control word stream and initiates a scan for REQ (Interrupt/Data Transfer Request). (Data may also be serviced in Burst Mode, or by a simple sense "busy or done" method).

When a REQ is detected, the Scan Counter generates an address into CAR, and a service control word routine is entered which transfers data to or from the control electronics via a SND or RCD instruction. Addresses and byte counters are updated.

If the byte counter is exhausted, LASTB (Last Byte) signal must be issued to the control electronics. This is done by setting the LAST BYTE FLAG prior to SND or RCD. The service routine is terminated by using CON 6 which starts the scan process again.

When an I/O CE has terminated, it generates a TERM signal. TERM is detected by the scan logic which initiates a termination control word routine. The termination routine sequentially reads out status of each I/O CE until it finds which one caused the termination. When the terminating I/O CE is detected, its termination condition is reset automatically by the RECEIVE STATUS (RCS) instruction.

CONTROL WORK DESCRIPTION MEMORY REFERENCE ARITHMETIC AND LOGICAL

The following table is a summary of control words used in the system of the present invention and a preferred set of bit patterns representing them.

| Cycle | Length | Code | Description | Bit Pattern 7654 | 3210 |
|---|---|---|---|---|---|
| 2 | 1 | SKP | Skip | 0000 | XXXX |
| 2 | 1 | PRC | Process | 0001 | XXXX |
| 2 | 1 | TFR | Transfer Register | 0010 | XXXX |
| 2 | 1 | JSH | Jump Short | 0011 | XXXX |
| 2 | 1 | SND | Send Data | 0100 | 0XXX |
| 2 | 1 | SNC | Send Command | 0100 | 1XXX |
| 2 | 1 | RCD | Receive Data | 0101 | 0XXX |
| | | RCS | Receive Status | 0101 | 1XXX |
| 2 | 1 | RES | Reset Bit | 0110 | 0XXX |
| 2 | 1 | SET | Set Bit | 0110 | 1XXX |
| 2 | 1 | CON | Control | 0111 | 0XXX |
| 2 | 1 | SNS | Sense Bit | 0111 | 1XXX |
| 2 | 1 | STD | Store Data | 1000 | 0XXX |
| 2 | 1 | LDD | Load DR | 1000 | 10XX |
| 2 | 1 | LDS | Load SYR | 1000 | 11XX |
| 2 | 1 | LCT | Load Counter | 1001 | XXXX |
| 2 | 2 | LAI | Load Address IM. | 1010 | XXXX |
| 2 | 2 | JMP | Jump Long | 1011 | XXXX |
| 3 | 2 | STI | Store Immediate | 1100 | 0XXX |
| 3 | 2 | UPI | Update | | |

| Cycle | Length | Code | Description | Bit pattern 7654 | 3210 |
|---|---|---|---|---|---|
| 3 | 2 | LCI | Immediate Load Compare | 1100 | 100X |
| 3 | 1 | UPC | Immediate Update | 1100 | 1100 |
| 3 | 1 | STA | Counter Store | 1101 | XXXX |
| | | | Address | 1110 | XXXX |
| 3 | 1 | BWR | Burst Write | 1111 | 0XXX |
| 3 | 1 | BRD | Burst Read | 1111 | 1XXX |

*X indicates that the place has no significance to the code itself and can be either 0 or 1, the various choices having different meaning within the group.

CONTROL WORD DESCRIPTIONS

It will be appreciated codes selected for a computer are somewhat arbitrary and therefore discussion in terms of a particular code, whether preferred or not, is somewhat misleading. Here, however, we give an example of one code word with the understanding that other code words are formed in the same manner.

| O P CODE | CONDITION |
|---|---|
| 0000 | XXXX |
| 7 4 | 3 0 |

SKP — Skip

The Skip instruction SKP senses a condition selected by bits (3–0) in the bit pattern. Upon occurrence of this 0000 code in the operation code 7–4 positions in the bit pattern, control is passed to the instruction located *two* locations forward in the instruction stream. If the condition is absent, control is passed to the next instruction in sequence which may be a one or two byte instruction. This permits a jump long JMP instruction, which is two bytes long, to be either entered or skipped. When bits 3–0 are all zero, the next instruction following SKP is always entered, and this combination is an NOP. The following conditions, here represented by their decimal equivalent but appearing in binary form in bits 3–0, may be sensed by SKP:

| | |
|---|---|
| 0 No Skip (NOP) | 8 REQ Present |
| 1 Always Skip | 9 VRC=1 |
| 2 Carry | 10 Optional |
| 3 No Carry | 11 Remote SW=1 |
| 4 Zero Result | 12 Norm SW=1 |
| 5 Non-Zero Result | 13 XMT SW=1 |
| 6 SAVE =1 | 14 RCV SW =1 |
| 7 SAVE= 0 | 15STOP SW=1 |

Codes 11 to 15 are set by console switches. Codes 11 and 15 are set by toggle type, while codes 12, 13, and 14 are encoded position numbers of a rotary mode switch. The code for the rotary mode switches is shown in the table below:

| CONSOLE MODE SWITCH POSITIONS | | SKIP CODE NORM 12 | XMT 13 | RCV 14 |
|---|---|---|---|---|
| XMT–RCV | 1 | 0 | 1 | 1 |
| XMT | 2 | 0 | 1 | 0 |
| RCV | 3 | 0 | 0 | 1 |
| LOAD | 4 | 1 | 1 | 0 |
| LIST | 5 | 1 | 0 | 1 |

VRC is a toggle flipflop operated upon by the CON instruction. The LK register and 0 bit position are set or reset as a result of arithmetic or shift operations. By setting or resetting bit 0, program switch functions may be implemented in an economical manner. This causes SKIP to never skip, or always skip. Optional is a code that may be connected to anything the system designer needs.

PRC — Process

The Process instruction PRC, e.g., 0001 in the 7–4 positions in the bit pattern performs arithmetic and shifting operations upon data in DR and SYR, as specified by bits 3–0. The result is always placed in DR. The following hexadecimal codes indicate the specified operation:

| | |
|---|---|
| 0 DR+SYR | 8 DR+SYR with LINK (Carry) |
| 1 Shift right | 9 Shift right with LINK |
| 2 Shift left | 10 Shift left with LINK |
| 4 DR-SYR | 12 DR-SYR with LINK (Borrow) |
| 5 Rotate right | 13 Rotate right with LINK |
| 6 Rotate left | 14 Rotate left with LINK |

For all codes, the final carry or bit shifted or rotated is always placed in the LINK flipflop. For codes 8 through 14, the LINK from a previous operation is added or shifted in. These codes used in combination permit the addition, subtraction, shifting, or rotation of operands with multiple byte lengths. The rotation and shifting processes involve only DR. SYR is not utilized for these operations. The unspecified code cominations (i.e., 3, 7, 11, 15) are used to perform functions not associated with the Process instructions, and should not be specified in control word instruction streams.

Subtract and Compare Operations

The subtract operation (PRC4) takes the contents of SYR and subtracts it from DR and then places the results through center multiplexor in DR.

The compare operation (LCI) compares the contents of DR and SYR, but does not produce an arithmetic operand.

The LINK flipflop LK is a one bit register that holds the CARRY/BORROW from the previous operation. Both subtract and compare affect the settings of the LINK and ZERO flipflops. Their significance is as follows:

a. If ZERO is set, the contents of SYR and DR are equal.
b. If ZERO is reset and LINK is reset, then the operand in DR is less than the operand in SYR.
c. If ZERO is reset and LINK is set, then the operand in DR is greater than the operand in SYR.

"COMPARE RESULTS" TRUTH TABLE FOR SKIP TESTS

| TEST CONDITION | TEST INDICATORS* ZERO | LINK |
|---|---|---|
| DR equals SYR | 1 | X |
| DR greater than or equal to SYR | X | 1 |
| DR less than SYR | X | 0 |
| DR greater than SYR | 0 | 1 |
| DR less than SYR | 0 | 0 |

*X=0 or 1 is immaterial

The subtract and compare operations are performed in the following steps:

1. Contents of DR are placed in TR.
2. TR is added to one's complement of SYR plus an initial carry.
3. The carry from the eighth adder stage is placed in LINK register.
4. The Logic Net output if all zeros will cause ZERO to be set; otherwise, it is reset.

EXAMPLES

| | | | |
|---|---|---|---|
| I. DR | = | 1001 | 1001 |
| SYR | = | 0001 | 0001 |
| Adder input No. 1 | = | 1001 | 1001 |
| Adder input No. 2 | = | 1110 | 1110 |
| Initial Carry | = | | 1 |
| Logic Net Out | = | 1000 | 1000 with carry |
| LINK set, ZERO reset | | | |
| II. DR | = | 0001 | 0001 |
| SYR | = | 1001 | 1001 |
| Adder input No. 1 | = | 0001 | 0001 |
| Adder input No. 2 | 32 | 0110 | 0110 |
| Initial Carry | = | | 1 |
| Logic Net Out | = | 0111 | 1000 with no carry |
| ZERO reset, LINK reset | | | |
| III. DR | = | 0011 | 0011 |
| SYR | = | 0011 | 0011 |
| Adder input No. 1 | = | 0011 | 0011 |
| Adder input No. 2 | = | 1100 | 1100 |
| Initial Carry | = | | 1 |
| Logic Net Out | = | 0000 | 0000 with carry |
| ZERO set, LINK set | | | |

From the above examples, it should be noticed that a correct difference results when LINK is set, but an incorrect difference results when LINK is reset. If the correct difference is of interest in subtract operations, the two's complement must be taken of the incorrect result to obtain the correct result. This may be done in the following manner:

1. The subtract is performed.
2. If LINK is reset, then transfer DR to SYR.
3. Perform a second subtract. This will cause DR to be zeroed, since the same operand is being subtracted from itself.
4. Perform a third subtract. This will produce the correct result in DR. Of course, the original SYR operand is lost.

Multiple Byte Subtract operations

The principle outlined above holds true for multiple byte operations, where larger number operands are being operated upon. However, the LINK is sensed only upon the final subtract. Zero must be sensed after every byte operation and a running tally kept of ZERO by the programmer. In general, the right-most or least significant byte uses subtract (PRC4). Additional operations to the left must use subtract with borrow (PRC12).

The computer of the present invention is different from other machines. Normally, the operations required above are invisible to the programmer on conventional sign with magnitude or two's complemented signed machines. The burden of recomplementing subtracts with no carry, or keeping tract of zero across memory boundaries, is normally performed by the hardware. This machine treats the most significant bit, not as a sign, but as an operand. This saves hardware and facilitates multiple byte operations.

The following examples show how the DR and LINK register data is affected by shift operations:

Right Shift — PRC1 (divide by 2)

| 7 | 6 | 5 | 4 | 3 | 2 | 1 | 0 | LK | |
|---|---|---|---|---|---|---|---|---|---|
| 1 | 0 | 0 | 0 | 0 | 0 | 0 | 1 | 0 | Start |
| 0 | 1 | 0 | 0 | 0 | 0 | 0 | 0 | 1 | PRC 1 Executed |
| 0 | 0 | 1 | 0 | 0 | 0 | 0 | 0 | 0 | PRC 1 Executed |

Shift Left — PRC 2 (multiply by 2)

| LK | 7 | 6 | 5 | 4 | 3 | 2 | 1 | 0 | |
|---|---|---|---|---|---|---|---|---|---|
| 0 | 0 | 1 | 0 | 0 | 0 | 0 | 0 | 1 | Start |
| 0 | 1 | 0 | 0 | 0 | 0 | 0 | 1 | 0 | PRC 2 Executed |
| 1 | 0 | 0 | 0 | 0 | 0 | 1 | 0 | 0 | PRC 2 Executed |
| 0 | 0 | 0 | 0 | 0 | 1 | 0 | 0 | 0 | PRC 2 Executed |

Rotate Right — PRC 5

| 7 | 6 | 5 | 4 | 3 | 2 | 1 | 0 | LK | |
|---|---|---|---|---|---|---|---|---|---|
| 1 | 0 | 0 | 0 | 0 | 0 | 0 | 1 | 0 | Start |
| 1 | 1 | 0 | 0 | 0 | 0 | 0 | 0 | 1 | PRC 5 Executed |
| 0 | 1 | 1 | 0 | 0 | 0 | 0 | 0 | 0 | PRC 5 Executed |

Rotate Left — PRC 6

| LK | 7 | 6 | 5 | 4 | 3 | 2 | 1 | 0 | |
|---|---|---|---|---|---|---|---|---|---|
| 0 | 0 | 1 | 0 | 0 | 0 | 0 | 0 | 1 | Start |
| 0 | 1 | 0 | 0 | 0 | 0 | 0 | 1 | 0 | PRC 6 Executed |
| 1 | 0 | 0 | 0 | 0 | 0 | 1 | 0 | 1 | PRC 6 Executed |
| 0 | 0 | 0 | 0 | 0 | 1 | 0 | 1 | 0 | PRC 6 Executed |

Shift Right with Link — PRC 9 (divide by 2 with remainder)

If the same byte is shifted more than once, this function acts as a 9 bit rotate.

| 7 | 6 | 5 | 4 | 3 | 2 | 1 | 0 | LK | |
|---|---|---|---|---|---|---|---|---|---|
| 0 | 0 | 0 | 0 | 0 | 0 | 1 | 0 | 1 | Start |
| 1 | 0 | 0 | 0 | 0 | 0 | 0 | 1 | 0 | PRC 9 Executed |
| 0 | 1 | 0 | 0 | 0 | 0 | 0 | 0 | 1 | PRC 9 Executed |

Shift Left with Link — PRC 10 (multiply by 2 with carry)

| LK | 7 | 6 | 5 | 4 | 3 | 2 | 1 | 0 | |
|---|---|---|---|---|---|---|---|---|---|
| 1 | 0 | 1 | 0 | 0 | 0 | 0 | 1 | 0 | Start |
| 0 | 1 | 0 | 0 | 0 | 0 | 1 | 0 | 1 | PRC 9 Executed |
| 1 | 0 | 0 | 0 | 0 | 1 | 0 | 1 | 0 | PRC 9 Executed |

Rotate Right with Link — PRC 13

| 7 | 7 | 5 | 4 | 3 | 2 | 1 | 0 | LK 6 | |
|---|---|---|---|---|---|---|---|---|---|
| 0 | 0 | 0 | 0 | 0 | 1 | 1 | 0 | 1 | Start |
| 1 | 0 | 0 | 0 | 0 | 0 | 1 | 1 | 0 | PRC 13 Executed |
| 1 | 1 | 0 | 0 | 0 | 0 | 0 | 1 | 1 | PRC 13 Executed |
| 1 | 1 | 1 | 0 | 0 | 0 | 0 | 0 | 1 | PRC 13 Executed |

Note that the LINK bit is ORed with $2^0$ bit and the result rotates into $2^7$ position.

Other Control Words

Transfer register (TFR) uses part of the control word to instruct a transfer action and the rest to designate one register from which contents are to be removed and another register into which those contents are to be transferred. For example, 7–4 bits may be the fixed transfer code, the 3–2 bits designate the register from which transfer to occur and the 1–0 bits designate the register into which transfer will occur.

Jump short (JSH) uses part of the control word (e.g. bits 7–4) to identify itself and part (e.g., bits 3–0) to be transferred into designated bits (e.g. 3–0) of CAR register without disturbing other bits in the register. The transfer will affect a 16 byte area of the instruction stream but it is only concatenation, not addition or subtraction.

Set bit (SET) sets a selected bit in the DR register to its ONE binary state regardless of its previous condition. This is done by using selected bits (e.g. bits 2–0) of the control word to select the bit location in DR to be affected. Remaining bits in DR remain undisturbed.

Reset bit RES resets a bit in DR, as determined by selected bits (e.g., 2–0) of the control word instruction, to the ZERO binary state regardless of its previous condition. Remaining bits of DR are undisturbed.

Sense bit SNR senses a selected bit in the DR register and performs in a similar manner to the SKP instruction. The bit selected for sensing in DR is designated by preselected bits of the control word. If the bit selected in DR is in the ONE state, control is passed to the instruction located two bytes forward in the instruction stream. If the selected DR bit is zero, control is passed to the next instruction in sequence.

Control (CON) instruction performs important functions by the simple set and reset of flipflops. By using the selected three bit part of the control word the following codes, for example, affect designated flipflops in the manner indicated: (0) set Check Flipflop Console Indicator, (1) set LAST BYTE, (2) set SAVE Flipflop, (3) reset SAVE Flipflop, (4) complement VRC Flipflop, (5) reset VRC Flipflop and reset LAST BYTE, (6) set CONTROL WORD IDLE MODE and reset LAST BYTE, and (7) reset RUN (Halt).

The CHECK flipflop is what its name implies, a means of checking for error. It is set by parity error and by CON. CHECK is reset only by General Reset. Thus parity error flipflop when set, lights the console CHECK light, and performs no other action. The light is intended to alert the operator. Any error condition detected by the control word stream should cause CHECK to be set. A control word should load a memory location with an error code, and then halt the system with CON 7.

The LAST BYTE flipflop is used to generate the LASTB signal during a Send Data or Receive Data signal, if set. If reset, LASTB is not generated during these instructions. Likewise, LAST BYTE is used to generate LASTB signal during Burst Read or Burst Write when these instructions terminate, if set. If reset, LASTB is not generated. LAST BYTE is reset by either CON 6 or CON 5, as indicated.

The SAVE flipflop is used to save CAR in MAR during JMP, if set. If reset, MAR is undisturbed during JMP. The SAVE flipflop also modifies STA execution. If SAVE = 1, STA stores MAR. If SAVE = 0, STA stores only DR. SAVE may also be used as a general purpose indicator.

A VRC (vertical redundancy check) flipflop may be used to generate VRC bytes for data transmission. The same flip flop or another of its type may generate LRC (longitudinal redundancy check) bytes or any other redundancy character for accuracy control in data transmission. Complement VRC will cause VRC to assume a state opposite from that prior to the instruction. If ONE prior, ZERO after. If ZERO prior, ONE after, Reset VRC initializes VRC for these VRC byte generations. Reset VRC follows by *one* complement. VRC will always leave VRC in the ONE state. When VRC is set during Burst Write, a hexadecimal 10 transmission occurs. VRC is a programable parity generator useful in conjunction with a burst write command.

Reset of CWTIME flipflop sets the Control Word Idle mode which causes the Control Word stream to halt execution and causes the Priority (interrupt Data Transfer Request) Scanner to commence scanning for REQ's. When REQ or TERM is found, CWTIME is set by hardware, an address generated by the scanner is placed into CAR, and Control Word execution continues on. Eight different CAR addresses may be generated, to represent respectively: REQ 1, REQ 2, REQ 3, REQ 4, REQ 5, REQ 6, REQ 7 (TTY ENTRANCE), and TERM LINE.

When RUN flipflop is reset by its variation of CON, all control word execution is halted. RUN flipflop is set by depressing the START button. This Control Word is equivalent to the conventional HALT instruction in most computers.

The Load DR (LDD) instruction places the contents of a memory location specified by MAR into DR. Depending upon the contents of variable bits MAR is undisturbed, incremented by one at the conclusion of the instruction, used to address memory in a normal manner, or MAR bits are modified in addressing memory, for example, for accessing card code translation table interspersed with 5 × 7 or 6 × 8 dot pattern codes for printers or CRT.

The Load SYR (LDS) instruction places the contents of a memory location specified by MAR into SYR. Variable bits of the instruction perform the same functions as in LDD.

In response to Store Data STD the contents of DR are placed into a memory location specified by MAR. Again variable bits cause MAR either to remain undisturbed or be processed in some way, for example in a manner necessary for accessing a card code translation table.

The control word Load Counter LCT is used to load page local General Registers. The address selected by predetermined bits of the instruction and other bits of CAR are used to access memory and place the addressed memory location into DR.

Load Address Immediate LAI provides a 12 bit address field together with a 4 bit operation code. The 12 bit instruction is loaded into MAR if selected ones of its bits are non-zero, or is loaded into DR if those selected bits are all zero.

Jump Long JMP provides a 4 bit operational code and twelve bits of instruction to be loaded into CAR, thereby causing control to be transferred to the instruction at that address. If SAVE is set, the old contents of CAR is placed into MAR before the new field is placed in CAR. This provides a branch and link capability if desired. The address saved points at the byte address of the Jump CW. If SAVE is reset, MAR is not disturbed.

Update Immediate(UPI) causes 8 bits to be incremented by one each time the instruction is executed as set by an operation code of 5 bits, LINK and ZERO Flipflops are affected by the incrementation. One of the unused bits may be used in similar types of instructions to indicate overflow or to store other indicators. This permits an unlimited number of 256 count counters to be intermixed in the instruction stream. DR contains the updated immediate counter at the conclusion of the instruction.

Store Immediate (STI) provides a 5 bit operation code which causes bits of instruction to be stored in the memory location addressed by MAR. A ninth bit, if reset, leaves MAR undisturbed at the end of the instruction. If the ninth bit is set, MAR Is incremented by one at the end of the instruction. DR contains the immediate byte at the conclusion of the instruction.

Update Counter (UPC) increments page local General Registers and loads MAR (L). The address selected by 4 bits of the instruction and bits 4 of CAR are used to access memory and increment the selected byte by one. DR contains the updated byte at the conclusion of the instruction. Other address bits are taken as zero. Note that the 8 bits from HSM are also stored in MAR (L) before the DR is updated When SAVE is reset, the control Store Address (STA) word stores the contents of DR into the special location addressed by 4 bits of the instruction, and 4 selected bits of CAR. When SAVE is set, then the MAR is stored in two consecutive locations in memory as addressed by 4 selected bits of the instruction and 4 bits selected of CAR, subject to certain conditions. The lower eight bits of MAR is stored in the addressed location. The next four bits of MAR and the Scan Counter are stored in the addressed location plus one (adjacent location). This instruction is intended for use in saving MAR after execution of Jump Long and SAVE set.

Load and Compare Immediate (LCI) employs a byte of 8 bits which are loaded into SYR upon execution of this instruction provided by the eight bit operation code. The new contents of SYR are then compared with the contents of DR. The LINK and Zero flipflops are modified by the comparison process. The contents of DR are not disturbed. This instruction is intended for use in detecting control symbols passing between memory and the I/O CE's. It may also be used to test results of a prior PRC instruction.

Control Word Descriptions — Input/Output

The following input/output (I/O) micro-control words are used to control I/O operations. These control words are provided to send I/O commands or data to the control electronics (CE's), read data or status from the CE's, and poll CE's to determine active conditions. The use of micro-program control simplifies most I/O interface requirements by accomplishing counting, timing and buffering internally in micro-coded firmware or software. The micro-coded approach is less expensive than hardware control and, at the same time, provides "easy to change" versatility.

The control word Send Command (SNC) pulses the SNC interface line. It employs a 5 bit operation code and a 3 bit CE selection. Data is transferred from DR to the command register in the CE as selected by said 3 bits of the instruction over the 8 DATOUT lines. This normally starts the peripheral device to transfer data. The command is one byte in length.

The control word Send Data (SND) pulses the SND interface line. Data is transferred from DR to the data register in the CE as selected by 3 bits of the instruction over the 8 DATOUT lines. This is normally done in response to an interruptdata request (REQ).

The control word Receive Status (RCS) pulses the RCS interface line. Data is transferred from the status register in the CE as selected by the three least significant bits of the command over the 8 DATIN lines. This is done to poll CE's for termination identification and for status information.

The control word Receive Data (RCD) pulses the RCD interface line. Data is transferred from the data register in the CE as selected by 3 bits into the CPU DR. This is normally done in response to an interrupt-data transfer request (REQ).

BURST MODE DMA TYPE DATA TRANSFER

The BURST MODE makes it possible for every channel to be operated as a DMA type channel. Two special I/O control words called BURST READ (BRD) and BURST WRITE (BWR) are used in conjunction with the other previously described I/O command words to effect burst data transfers. BURST MODE permits up to 255 characters of data to be transferred at full memory cycle speed. This is in contrast to the normal I/O method, described heretofore, in which each character transfer requires a sequence of program steps to effect the transfer. Thus the CPU with memory having a full timing cycle of 2 microseconds can transfer data at a rate up to 500,000 Hz. It is important to note that of three general phases of an I/O operation (Initiation, Data Transfer and Termination), the BURST READ or BURST WRITE only performs the data transfer function.

The upper four bits of both control words BRD and BWR are idetnical; the lower three bits selcts the CE to be addressed. The differentiating bit is bit 3, which controls designated gates to determine whether a BRD or BWR is to be executed. When the control word bit 3 is one, BRD is made effective; when bit 3 is zero BWR is made effective. Note that the BURST read and write signals refer to reading and writing to the CE, not to memory. Conversely, BRD results in a HSM write and BWR in a HSM read.

C. P. U. Operation

The CPU of the present invention is equipped to utilize many complementary consoles the number and type of which may be restricted for economy reasons. The applications will dictate the form factor of the panel.

Once a Burst instruction is staticized, it remains in effect until all of the bytes specified by a count previously entered into SYR have been transferred. Therefore only one CE can be serviced during Burst mode; concurrent servicing of multiple CE's, permissible during the normal I/O function, is not possible. Also, since the Burst instruction remains in effect until all bytes have been transferred, the staticizing cycle is not required after phase A is once entered; the CPU ping pongs between Phase A and Phase B for the remainder of the burst control word.

Figure 12:
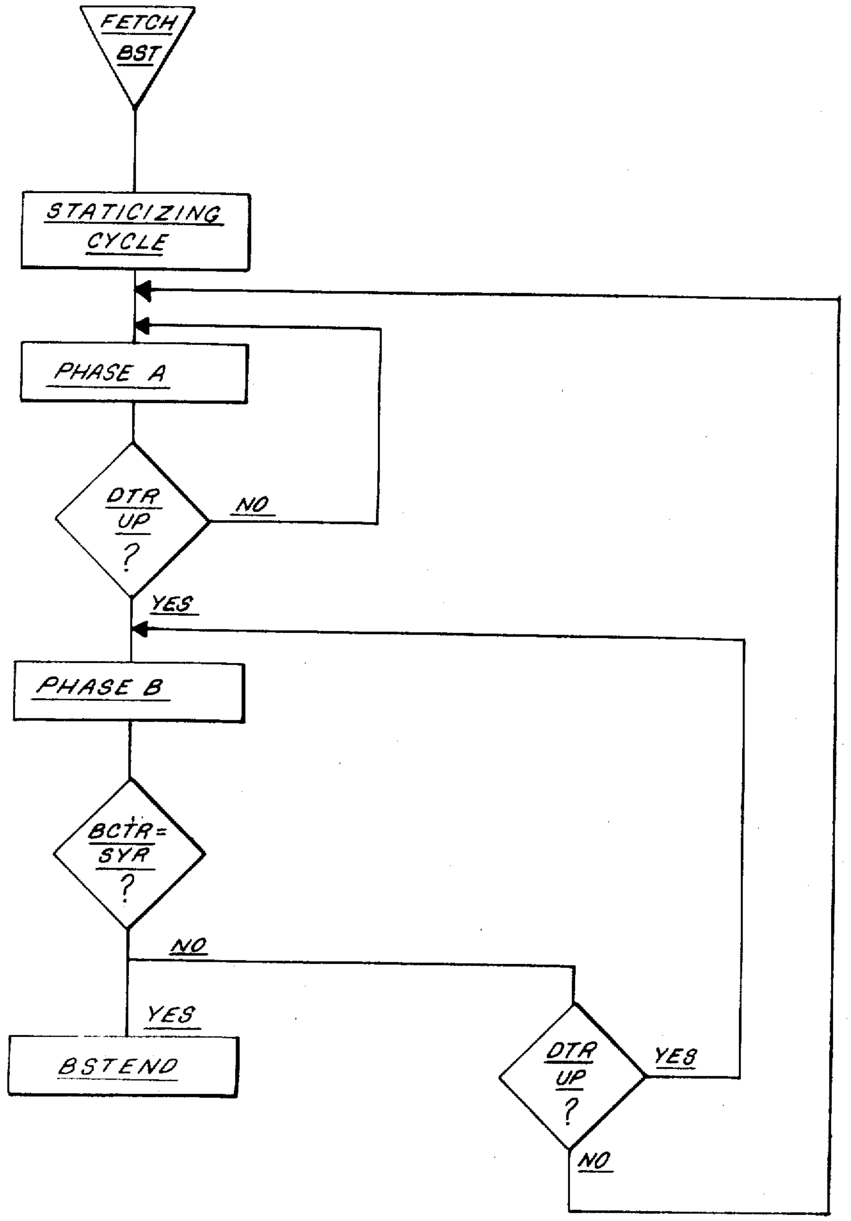
FIG. 12 is a block diagram showing the phase sequence for burst control commands.

It enters phase A to await the reception of a data transfer request, shifts to phase B after one has been received in order to generate a memory cycle, and remains in phase B as long as a Request line is true. After the request is processed and provided another is not received, the CPU reverts to phase A to await the next request. It should be noted that a data exchange across the interface in Burst mode can be executed in either phase, but must always terminate in phase B in order to execute the memory read or write cycle. The determining element as to whether the CPU enters phase A or phase B is the state of the Data Transfer Request Up (DTRUP) flip-flop. This flip-flop effectively is the phase trigger for the Burst mode. The phase sequence for Burst control words is seen in the block diagram of FIG. 12 which facilitates explanation of Burst read and Burst write operations.

Burst Read

If a Burst read (BRD) instruction is being executed, during the interim between DTR's the DTRUP flip-flop is reset in status level A at TP2 time time and remains reset as long as a request is not received. With signal DTRUP-1P low, phase B cannot be entered since controlling gates are disabled. Nor can the staticizing cycle be entered at this time, since both inputs to its controlling gate are false. With no service request up, therefore, the CPU is locked in phase A.

At A3 time the DTRUP flip-flop input gate is checked. If a DTR has not been received, the flip-flop remains reset; the phase A cycle steps through A4 and A5 and recycles to A1 to repeat the process.

When the CE is ready to be serviced, it issues a data transfer request DTR to the CPU. The request is received at a gate where all Request lines are ORed to generate ANYREQ-P. This signal is applied to the DTRUP flip-flop input gate which, at the next timing pulse 3 (phase A), is enabled and sets the flip-flop.

Also at A3 time, a gate is enabled to output signal BSTDTR-N as true. This results in two events at A4 time: (1) the generation of RCD-P which pulses the interface line to the selected CE data in order to place the byte onto the Data In bus, and (2) the generation of BSTRO-N which enables the DR read-in control signals.

Concurrently at A4 time, the central multiplexor select signals are also enabled, so that the byte read over the interface lines is received from the Data In bus and placed in DR.

All conditions now having been satisfied, the downward transition of the clock pulse at A5 time sets the phase B flip-flop. It is in this manner the DTRUP flip-flop permits a spike-free decision to be made when switching from phase A to phase B on a asynchronous signal such as ANYREQ-P.

Phase B is the memory cycle phase of Burst mode. It is entered provided a DTR has been received in phase A. The memory Time Pulse flip-flop is also set at this time, so that CYCLE INITIATE-N is generated. This signal, in conjunction with another at a control gate, results in the appropriate one of memory cycle initiate signals through a predetermined channel to HSM. Coincidentally with CYCLE INITIATE true, a signal MTB-P enables a controlling gate so that WRITE CONTROL-N also goes true to generate a HSM write cycle. (Note that BRD does a CE read but a HSM write.) Memory address bus code 2 is activated at B1 time to allow the address in MAR to select the memory location to be written to.

At B2 time, the TR read-in control signals are enabled and the address in MAR is transferred into TR. The DTRUP flip-flop is also reset at this time to prepare the CPU to return to phase A at the end of the current phase B timing cycle, and await the next service request. Since a byte has now been received and stored in memory, the burst counter is also triggered at this time to record the event.

The Burst counter is an eight-stage binary counter connected in series with an effective common reset gate. The 1-side outputs of all eight stages are tapped off and exclusively ORed with the contents of SYR. In this manner the number of bytes currently transferred in Burst mode are continuously compared with the specified total number of bytes to be transferred. After each incrementation of the burst counter, which is to say after each byte transfer, a new comparison is made.

If the contents of SYR and the burst counter do not compare, further byte transfers are indicated and Burst mode continues. Thus at B3 time, the DTRUP flip-flop is again set provided a new DTR has been received, and the process of generating the RCD interface signal, reading in the byte on the Data In bus and storing it in HSM is repeated. This time, however, the byte is processed completely in phase B. If a DTR has not been received by B3 time, the CPU cycles through B4 and B5 and reverts to A1 at the downward transition of B5 time. Whether or not the next DTR is received while still in phase B or later in phase A depends upon the throughput rate of the device being serviced.

Burst Write

Burst Write (BWR) operation is similar to that of Burst Read. The CPU still "ping-pongs" between phase A and phase B. Now, however, no processing of data is done at all in phase A; it is used strictly as an interim waiting period whenever bytes are not being processed in phase B. The appropriate gate is still tested at A3 time for the presence of a DTR If one is not present, the CPU cycles in phase A until a request is received, at which time the DTRUP flip-flop is set at A3 time. The CPU then cycles through A4 and A5 and enters phase B.

At B1 time CYCLE INITIATE-N is generated and WRITE CONTROL-N remains false to indicate a HSM read cycle. (The BWR does a CE write but a HSM read.) The initiate cycle select circuit generates the proper signal according to the memory module being addressed. Concurrently MAB signals are generated to address the memory location to be read from.

At B2 time the TR read-in control signals are enabled and the address in MAR is transferred to TR where it is incremented by a signal initiated from the flip-flop. The burst counter is triggered by B2-P to record the byte transfer.

At B3 time, central multiplexor select code 4 and the DR read-in control signals are generated to transfer the byte from HSM into DR.

At B4 time, the byte in DR is transferred onto the DATA OUT bus. Concurrently, a gate is enabled so that the SND (send data) interface line is pulsed to enable read-in of the byte on Data Out bus into the CE data register. If a DTR was not received during the interim between B3 and B4, the DTRUP flip-flop is reset.

At B5 time, the MAR read-in control signals are generated and the incremented address in TR is returned via the logic net and central multiplexor busses to MAR. If the DTRUP flip-flop remained set at B4 time due to reception of a new DTR, the CPU returns to B1 and repeats the processing cycle. If a new DTR was not received and the DTRUP flip-flop reset at R4 time, the CPU returns to phase A to await the next DTR.

Burst End

Each time a byte is transferred across the I/O Channel interface bus, the burst counter is triggered and its contents incremented by one. As noted previously, this count is continuously compared via exclusive OR gates with a previously entered count in SYR. The count in SYR represents the desired number of bytes that make up the data block. When the compared counts are equal, a gate is enabled and signals BRSTEND-P and BRSTEND-N are true indicating burst end. A separate, portable Maintenance Panel like test panel 46 can be used for very intimate control of computer for software debug purposes. In addition, an 8 bit program controlled Display Status Register is also available as an option to the Operator's Console.

A typical operator panel control and display function includes some of the following components: "POWER" toggle switch which applies or removes power from the unit. "START" push button which initiates operation of the CPU control word stream. "RE- SET" pushbutton which returns the logic state of the CPU and system to a predetermined condition. A "RUN/STOP" toggle switch which brings CPU operations to an orderly halt after being sensed by microcode. The six position rotary "MODE" switch selects operating mode of the system. The following positions might be typical: XMT-RCV, XMT, RCV, INITIAL LOAD, LIST, AND MAINTENANCE CONTROL (MC). The functions of most of these positions are determined by software or a particular system designer. However, on INITIAL LOAD CPU load memory and MC is used when the Maintenance Panel is employed. A lamp RUN which indicates if the terminal system is operating. A lamp CHECK which indicates if an error has been detected since the START button was depressed.

A group of four lamps provide an Error Encode Display that encode 1 out of 16 error stop codes.

The Maintenance Panel, test panel 46, is a hardware level control console that can be used for both maintenance and software debug. It is always used in conjunction with the CPU's operator's panel. The Maintenance Panel is preferably a cable plug-in device that may be rack-mounted or attache case-mounted for portability and economy when permanent mounting is not needed during operation.

Console Functions

Data Display is a group of 12 lamps which display the registers or conditions selected by the DISPLAY/CONTROL SELECT SWITCH.

Data Control is a group of 12 alternate action switches used to load addresses, control words, and other data into the CPU.

An eight position Display/Control Select rotary switch selects the source and destination of data for the DATA DISPLAY and DATA CONTROL.

A Remote/Local toggle switch is program sensed to alter the mode of operation.

A Repeat/Normal toggle switch causes the hardware of the CPU to repeat the current command word operation.

A Step/Normal toggle switch allows only one CPU cycle to execute each time "Start" on the operator's panel is depressed.

Control Panel Procedures make it possible by the following typical successive steps to produce the following FUNCTIONS:

To use the DISPLAY REGISTER, turn the DISPLAY CONTROL switch to the desired position and read the DATA DISPLAY lamps.

To turn the DISPLAY CONTROL SELECT Switch to the desired position, set up the DATA CONTROL Switches, and depress "START" on the Operation Panel.

To set up address in MAR, set up an LDD CW in CWR, activate ONE STEP, activate REPEAT toggle, and depress START twice. When the display CONTROL selects DR, memory data is displayed in the DATA DISPLAY lamps. Successive depression of START will read successive memory locations.

To WRITE MEMORY, set up address in MAR, set up data in DR, set up STD CW in CWR, activate ONE STEP, activate REPEAT TOGGLE, and depress START twice. Successive depression of START will write successive memory locations.

Real Time Clock (RTC) Operation

The clock generates a sequence of pulses that is independent of processor timing. The clock frequency is adjustable, but normally it is set to raise an REQ 6 every 1/256th of a second. The clock is used primarily for low resolution timing (compared to processor speed), but it has high long-term accuracy. Common uses for the clock are: (a) Time of Day, (b) Time-outs to detect "silent deaths" in I/O sub-system, and (c) Hold-off delays for I/O devices.

The Micro-Control Word SEND COMMAND (SNC) is used to start the clock. (The clock select number is 7). After 1/256th of a second has passed, the clock will raise REQ 6. If the CPU is in the Control Word Idle Mode, a service routine will be entered. The first instruction in the service routine is usually a SEND DATA (SND) which resets the REQ 6 from the clock. Subsequent instructions in the service routine increment a seconds, and possibly minutes or hours. counters.

Teletype and Other Input and Output

Teletype requires conversion from serial to parallel coding and other problems not unusual in the art. The techniques employed in connection with various input and/or output devices are conventional but require specific adaptation to the CPU of the present invention and its micro-programming concept.

INPUT/OUTPUT SYSTEMS

Typical Interface Flow

Figure 6:
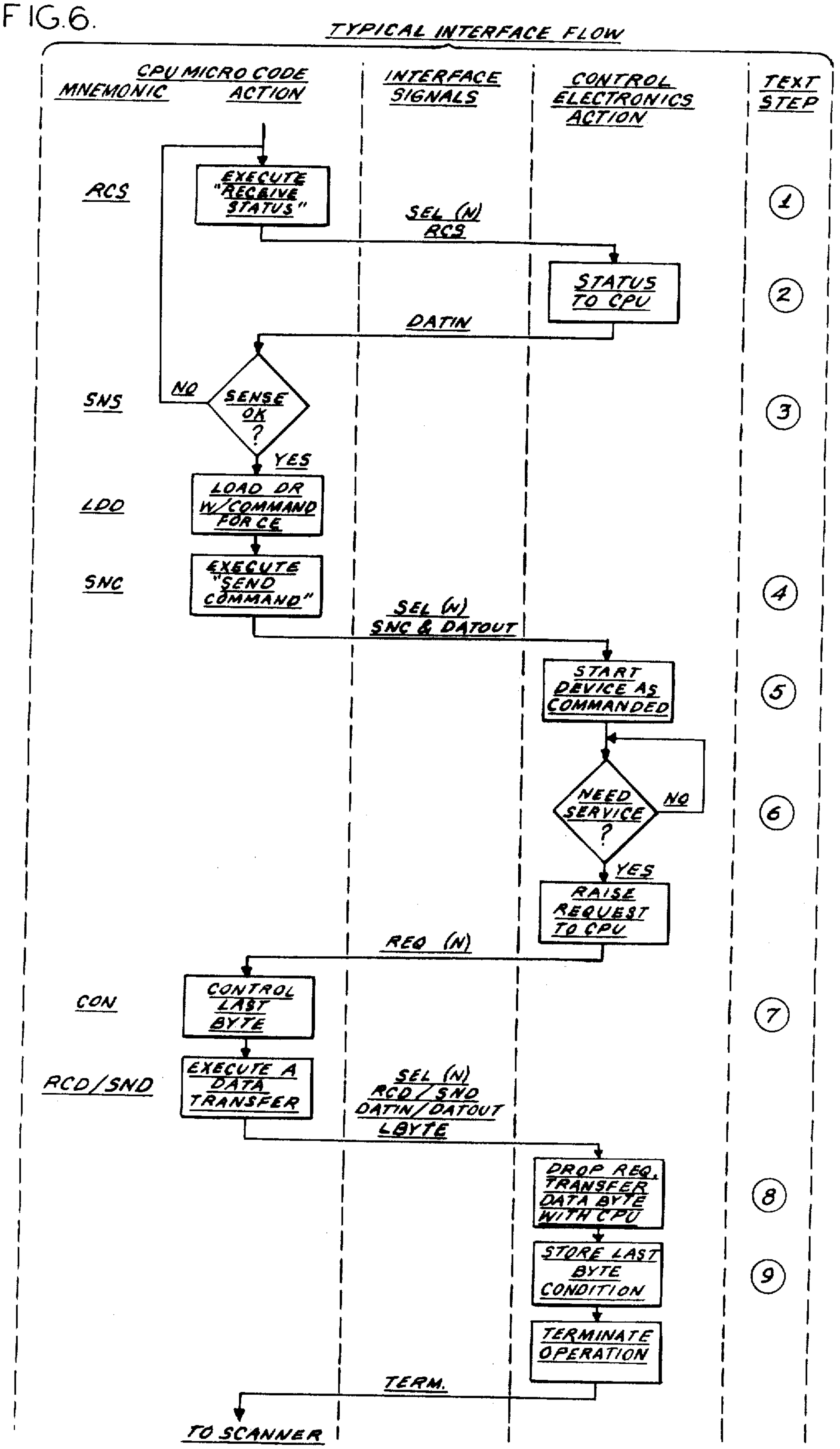
FIG. 6 is a bock diagram representing typical interface flow in one mode of operation between the central processor unit and a selected control electronics.

Referring to FIG. 6 a typical sequence of operations over the channel for a given CE illustrated in flow chart which represent the following steps:

1. The CPU addresses a particular CE, here shown as CE 6, during a "receive status" (RCS) micro-code control word. The select line for that CE goes TRUE.

2. The selected CE responds to the RCS signal broadcasted on the interface by transmitting its status over the datain DATIN) lines to the CPU. The status byte is sent to the CPU Data Register (DR 22).

3. If the Status Byte indicates a "go" condition, (operable, not busy, etc.) the CPU micro-program executes a command transfer. 4. An I/O command byte for the CE is sent by the CPU micro-code control word "send command" (SNC). This control word again raises the select line and then transmits the contents of CPU data register (DR 22) to the data out (DATOUT) lines. The data register was already loaded by previous micro-code with the I/O command byte.

5. The selected CE inputs the command byte and acts upon the command.

6. When read and write data is to be transferred with the CPU, the CE may raise the request line REQ (interrupt/data transfer request) or raise a status bit in its status byte.

7. If the CPU is permitted to monitor the request lines, the priority scanner or a SKIP Request control word will detect the request signal and cause the receive data (RCD or send data (SND) miro-command to be executed. (If the interrupt/data transfer request system is not used, a receive status (RCS) Control Word can detect a CW status byte indicator bit).

8. When the CPU executes the data transfer micro-code control word, the again selected CE transfers its data over the appropriate bus with the CPU.

9. If, during the transfer, the last byte was being transferred, a CONTROL LAST BYTE Control Word would be executed before the data transfer. The signal LAST BYTE is transmitted from the CPU if the last byte condition was set by the "CONTROL" control word. A termination sequence is only used with CE's that need it, and some do not.

10. After the receipt of LAST BYTE, the CE will finish processing the last byte. It then raises the common termination line to the CPU.

11. The termination line is connected to the lowest priority position on the priority scanner that monitors the seven Request (Interrupt/Data Transfer Request) lines.

12. When the CPU responds to the termination condition, it must poll each CE with a status receive (RCS) Control Word. The CE that has terminated must have the $2^0$ bit of its status byte *reset to a zero* to indicate it is in a termination condition. When the CPU detects the $2^0$ bit equal to zero, it will send a term reset to the CE. At this time, the CE will reset its terminate logic. $2^0$ bit ("NONTERM") of the status byte will now be a one.

Figure 7:
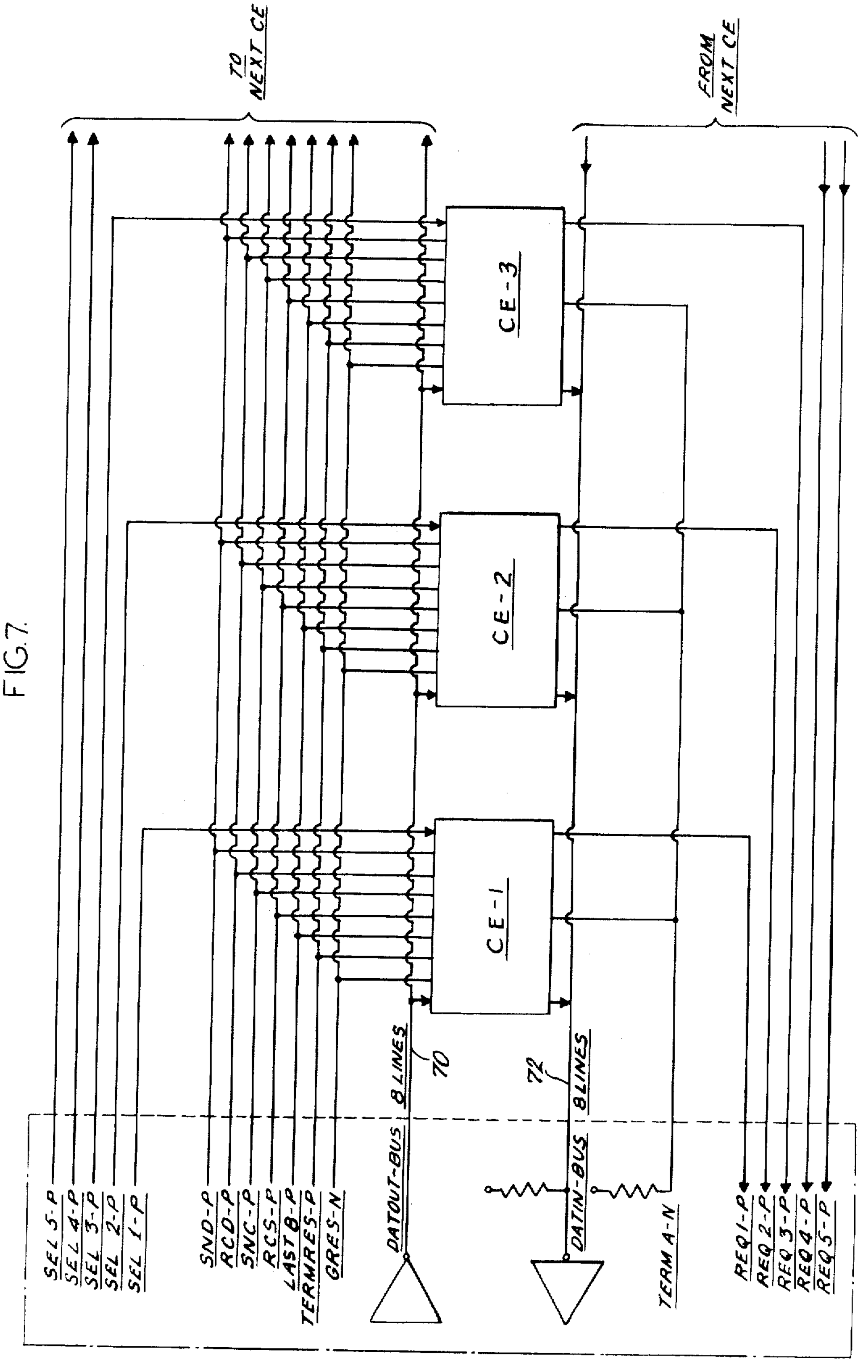
FIG. 7 is a schematic diagram showing in some detail the connections between the central processor unit and representative control electronics.

The data out bus 70 in FIG. 7 connects the output of the CPU's 8 bit data register (DR) 22 with each Control Electronics (CE). The data out bus is used to carry command data, device address data, and write out data. The data out consists of eight lines feeding each of the CE's in parallel each one of the data register bit positions. The data in bus 72 is an "or" input bus that is used to transfer status information, device address data, and read data from the CE's to the CPU. Again the data in bus consists of eight lines feeding through the center multiplexor 10 to the data register (DR) 22. It is important to note that address data is device address data and not control electronics (CE) address data. Device address data is only needed when multiple device CE's are used. FIG. 7 depicts the control signal arrangement, wherein the interface signals are of two types: (a) dedicated signals and (b) common signals.

Each (here one of five) CE has a dedicated select line SEL 1, SEL 2, SEL 3, SEL 4, and SEL 5 and each CE has a dedicated request line (REQ 1, REQ 2, REQ 3, REQ 4, and REQ 5. The SEL lines come out of the control word register CAR 14 through a decoder. They function implement the particular CE to be acted upon. The REQ lines constitute address out lines providing a memory address to the central multiplexor 10, or possibly to the interrupt scanner at an appropriate time. FIG. 7 also shows that each of the control lines which come from CWR 14, is common lines to all CE's. Each signal is provided by a different bit position in the control word (CW) to describe the function to be performed. The SEL line designates the CE to be affected since all CE's receive the CW signals. The signals shown in FIG. 4 are all the functional signals used in the channel interface. These interface signal functions may be summarized as follows:

DATIN (data in) provides a set of 8 common lines which transfers data to CPU from CE's. Data may be either read byte or status byte.

DATOUT (data out) provides a set of 8 common lines which transfers data from CPU to CE's. Data may be either a write byte or command byte.

REQ provides Interrupt/Data Transfer Request Lines, a set of as many dedicated lines as there are CE's which are unique to each CE. A REQ signal is generated when a CE wants to interrupt or transfer data. These lines are input to a priority scanner in the CPU.

SEL (select control electronics) (CE) provides as many dedicated lines as there are CE's one of which at a time carries a signal generated by the CPU. The SEL lines thereby selects one out of total number of CE's to interchange data and signals with. The SEL line dedicates to a given CE must be used by it to condition receipt or generation of the following signals: RCD, SND, RCS, SNC, LASTB and TERMRES.

Typical CE Write Sequence

Figure 8:
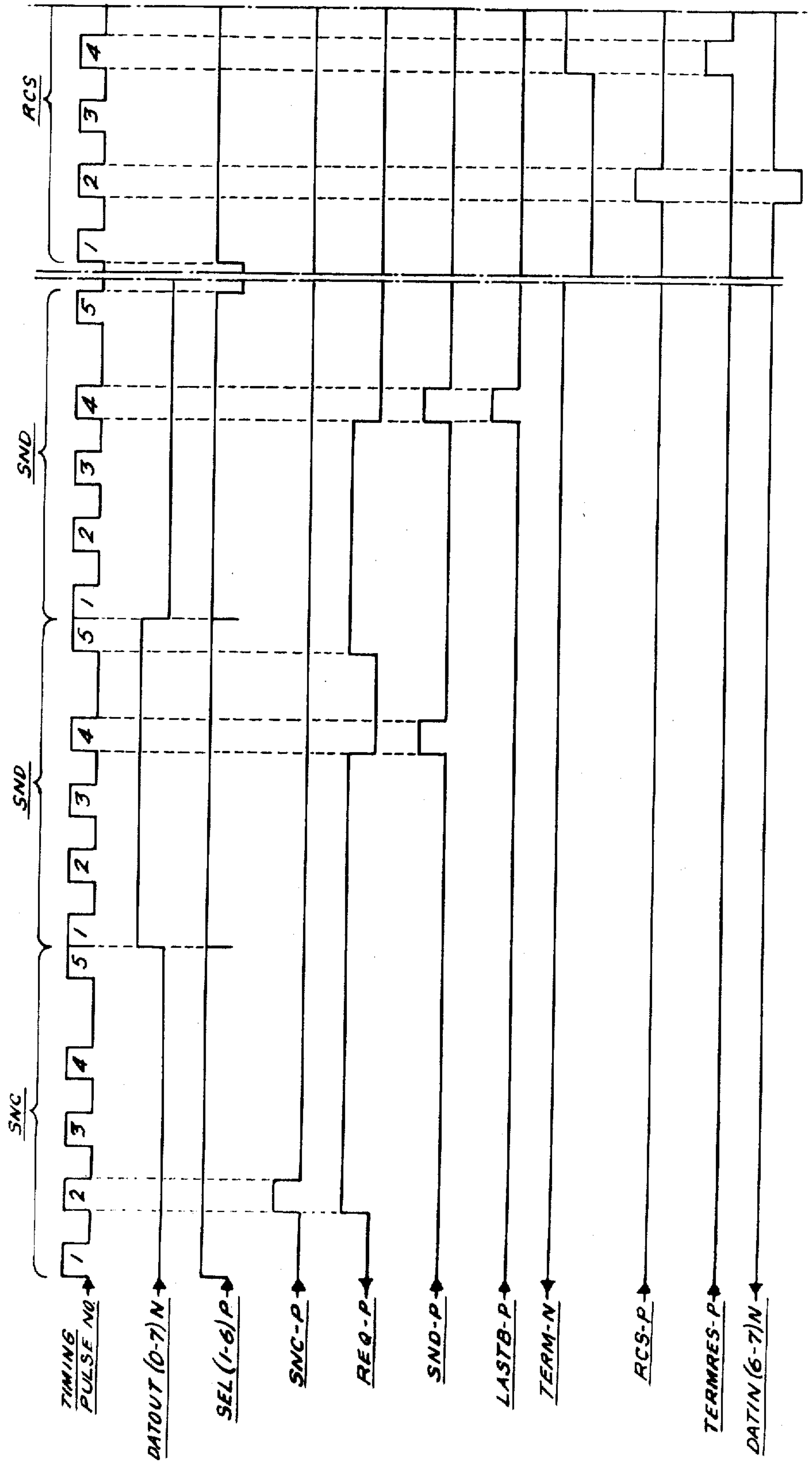
FIG. 8 shows time relationship between signals associated with the control electronics representative of the execution cycles only of the control electronics write sequence.

FIG. 8 shows the timing for a typical write of two bytes with termination to a CE. Only the execution cycles of the program are shown. The select line for the CE to be communicated with is raised during the Fetch cycle of all commands. At timing pulse 2 time of the execution cycle of the SNC command, the SEL line is gated. If the device was ready to accept data at this time, it would raise the REQ line. The REQ is honored by placing the first BYTE to be transmitted (HEX 00 in this case) on the DATOUT lines. At timing pulse 4 time during the execution cycle of the SND command, the DATOUT lines are gated into the DATA REG of the CE and the REQ flipflop is reset in the CE. When the device is ready for the second byte, the CE will again raise the REQ line which is honored in the same fashion. In the timing example, the second byte is the last byte and the TERM option is used. The signal LASTB is raised at timing pulse 4 time of the last SND command. It is used to condition the CE for termination. When the device is truly terminated (for example tape has stopped moving or a card is in the output hopper), the CE will cause the TERM line to become true and reset the $2^0$ bit in its status byte. The Term line is recognized by the CPU and honored by transmitting RCS commands in a priority polling sequence to all CE's. At timing pulse 2 time of the RCS command, the DATIN lines contain the status byte of the selected CE. When the CE that has the $2^0$ bit reset is selected, the CPU acknowledges by raising the TERMRES line at timing pulse 4 time. This combination (TERMRES-P and SEL-P) is used to reset the termination FF in the CE.

Input/Output Programming

A set of Input/Output control words (CW) is used to Control the information transfer on the interface. These microcommands are provided to send I/O commands or data to the CE's, read data or status from the CE's and poll CE's to determine active conditions.

The use of micro-program control simplifies most I/O interface requirements by accomplishing counting, timing and buffering internally in micro-coded firmware or software. The micro-coded approach is less expensive than hardware control and, at the same time, provides "easy to change" versatility.

Send Command (SNC) pulses the SNC interface line. Data is transferred from DR to the command register in the CE BY selected bits of the instruction transmitted over the 8 DATOUT lines. This normally starts the peripheral device to transfer data.

Send data (SND) pulses the SND interface line. Data is transferred from DR to the data register in the CE by selected bits of the instruction transmitted over the 8 DATOUT lines. This is normally done in response to an interrupt-data request (REQ).

Receive status (RCS) pulses the RCS interface line. Data is transferred from the status register in the CE by selected bits into the CPU over the 8 DATIN lines. This is done to poll CE's for termination identification and for status information.

Receive data (RCD) pulses the RCD interface line. Data is transferred from the data register in the CE by selected bits 2–0 into the CPU DR. This is normally done in response to an interrupt/data transfer request (REQ).

Data transfer by program control is accomplished by execution of the four input-output instructions previously described and various other micro-command words that are needed for counting, data manipulation and decision making. All I/O operations go through the three general phases of initiation, data transfer and termination. During initiation, the CE and subsequently the device must be checked for readiness or operability. Then the desired command must be loaded in the CPU data register (DR) to be sent via a SNC micro-command to the selected CE.

During the data transfer phase the REQ line (Interrupt or Data Transfer Request) is the CE's means of telling the CPU and program that it needs to be serviced. During initiation phase, the programmed command indicated to the CE the direction of data flow (send or receive). Since both the CPU and CE know the direction of data flow, it will suffice for the CE to only notify its need for service to the CPU with the request line. When the request line is used as a service need indicator, the CPU has three ways of detecting that a request line is active: sensing with a SKIP Instruction, scanning with the Priority Scanner or entering burst (DMA type) mode. In order to sense for a request (REQ), the "SKIP No-Request" command word is used.

Figure 9:
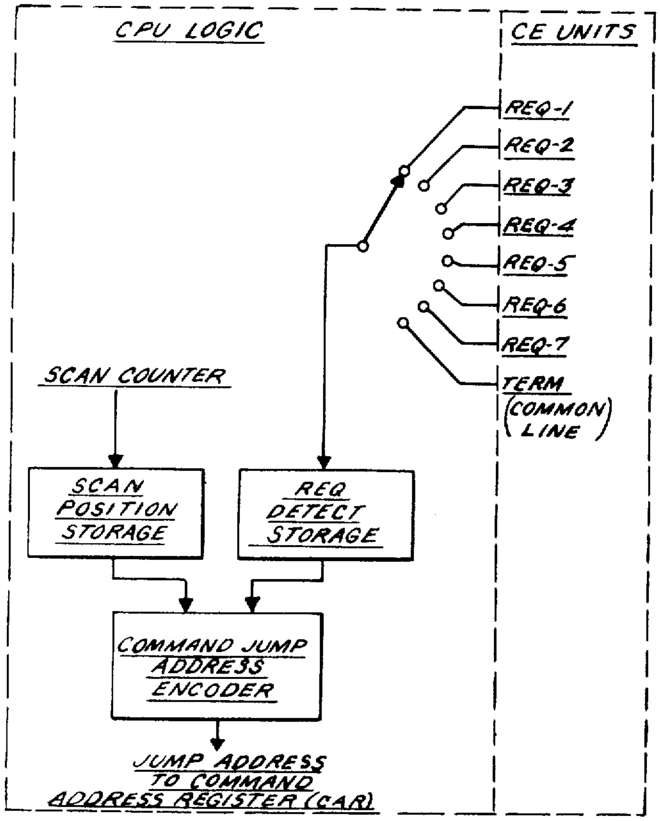
FIG. 9 is a schematic representation of a priority scanner of the present invention.

The SKIP instruction tests all request lines as an "OR" function. Thus if more than one CE is active, the hardware priority scanner or a programmed polling arrangement must be used. Preferred operation employs the hardware priority scanner when more than one CE is operating concurrently. The priority scanner is schematically illustrated in FIG. 9. As this schematic showing represents the hardware Priority Scanner can be though of as a rotating switch whose rotating wiper contact successively connects each REQ line in a sequential fashion to momentarily check each REQ line for activity. "Priority" is the order of scan since the first scanned will be the first serviced and thereby the priority scanner determines relative priority of the CE's and their input/output devices. The Scanner, in effect, polls each CE REQ line and TERM to see if a need for service exists. If a REQ or the TERM line is true, the REQ or the TERM and the current scan position (which is in effect the CE number) are stored in hardware. At this time, an address is encoded and placed into CAR. Micro-command control word execution now continues starting at the encoded address. For example, if there are seven CE's eight different CAR addresses are generated by the encoder, one for each CE REQ line and one for TERM. Each generated address is 16 bytes apart in its timing to allow room for an I/O service routine.

The method used to start the priority scanner in the CPU is by execution of the "CONTROL" 6 micro-code command word (CW). This CW sets a control word idle mode which causes the MICRO-code control word stream to halt further "compute" processing. At this time, the priority scanner is active until a REQ is received. Since the CPU is equipped with a real-time-clock (RTC) 44, the RTC will raise a REQ after a time if no other channels are active. After the REQ JUMP address is encoded and sent to the CAR, the RTC I/O service routine will have control of the micro-code CW stream.

Figure 10:
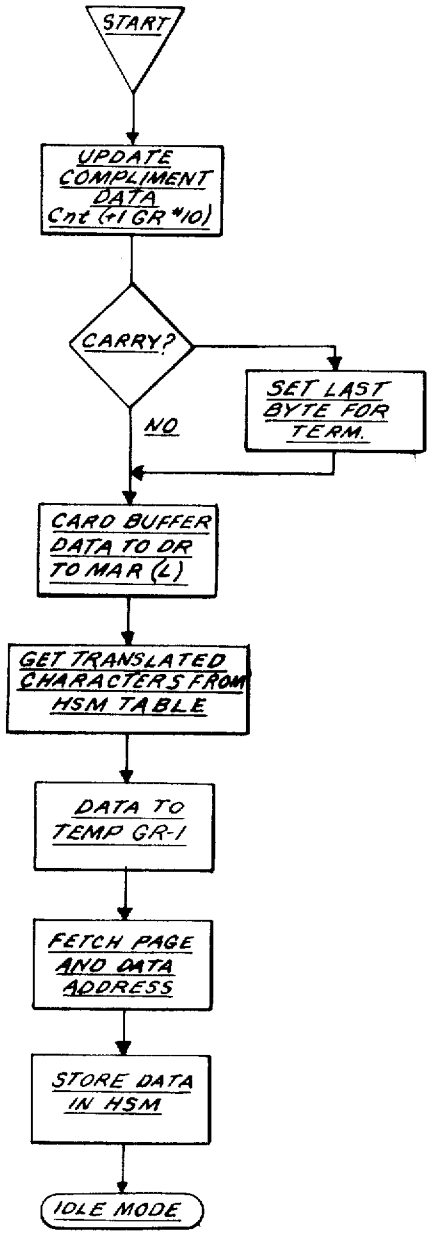
FIG. 10 is a block diagram representing a card reader service using the present invention.

The flow chart and coding that is shown in FIG. 10 is an example of a card reader data service routine. In the routine, core general registers (CR) are used to hold address and control information. These registers are set up during initiation as follows:

GR No. 10 — Compliment of the Data Count
GR No. 11 — Input Page Address (MAR (U))
GR No. 12 — Input Address (MAR (L))

Termination Phase

Figure 11:
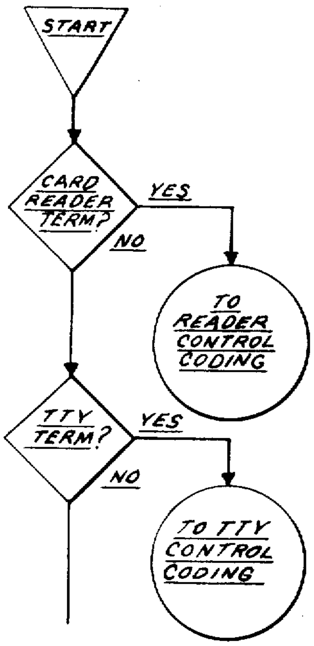
FIG. 11 is a block diagram representing a termination service using the present invention.

In FIG. 11 the lowest priority position of the Priority Scanner is connected to the Term signal line which is a common line used by all CE units. When the Priority Scanner finds a true condition on the TERM line, a predetermined CAR address is generated. A termination routine starts at this address to poll all CE units and determine which unit is terminating. The particular terminating CE is detected by examination of each CE status byte. For example, if the $2^0$ bit of the status byte is equal to zero, termination is indicated. After the terminating CE is found, micro-program control is passed via a JUMP CW to the appropriate processing routine.

Burst Mode DMA Type Data Transfer

The BURST MODE makes it possible for every channel to be operated as a DMA type channel. Two special I/O Command Words called Burst Read (BRD) and BURST WRITE (BWR) are used in conjunction with the other previously described I/O Control Words to effect burst data transfers. BURST MODE permits data to be transferred at full memory cycle speed. With a 1 microsecond memory, data can be transferred to a 1 megabyte rate. It is important to note that the three general phases of an I/O operation (Initiation, Data Transfer and Termination), the BURST READ or BURST WRITE only performs the data transfer function.

In burst read (BRD) a read from a Control Electronics by selected bits of the instruction is performed. The number of bytes transferred is controlled by bits in SYMBOL REGISTER (SYR). Burst read, when fetched, remains active until all bytes are transferred. This means that only one CE may operate, and I/O simultaneity is not permitted. However, bytes are being transferred at high speed.

The following bits in SYR selects the number of bytes transferred during a single burst read.

| | |
|---|---|
| SYR 4=1 | Count=1 |
| SYR 5=1 | Count=32 |
| SYR 6=1 | Count=64 |
| SYR 7=1 | Count=128 |

If more than one SYR bit is set, the burst read will terminate at lowest count selected.

LAST BYTE, when set, will cause LASTB to be generated when the burst read terminates. LAST BYTE, when reset, will inhibit LASTB generation during burst read. However, the burst command word still terminates in the CPU and allows another burst or another control word to be fetched.

In burst write (BWR) a write to a CE by selected bits of the control word is performed. Burst write, when fetched, remains active until all bytes are transferred.

The number of bytes transferred and LASTB generation is the same as in burst read. Burst write is also used to write at high speed.

If VRC = 1, an ASCII code hex write is performed. For each byte retrieved from memory, two half-bytes or 4 bits are transmitted over the I/O bus to the control electronics. If VRC =0, then normal byte transmissions are executed. The 16 hex symbols which may be printed in accordance with the previously stated table are 0, 1, 2, 3, 4, 5, 6, 7, 8, 9, :, ;, <, =, >, ?.

The following is a coding example of a hex BURST MODE write to the teletype CE. This example will output 32 hex characters (16 memory locations) starting at the current Memory Address Register (MAR) location.

80-C Interrupt Philosophy

The terminology "Interrupt" describes the situation where a real time event needs to "interrupt" the main high level flow of processing to communicate a priority need for sharing hardware. From the CPU point of view, it is preempted and must "service" the interrupting event. The term "interrupt" on a hardware or low micro level is in effect a "request for service" to the CPU. Interrupt always presumes a predetermined program stored to service the interrupt. The routine employed is unique to each device controlled. For the purpose of programming clarity, the terminology "REQUEST AND INTERRUPT" means the same thing in the discussion that follows.

I/O interrupts or requests may be grouped in two categories: data transfer requests and command terminations. A priority scanner scans for REQ (interrupt/data transfer request) and termination. This scanner is enabled only when interrupting requests can be permitted. Since it is not necessary to enable the priority scan until an interrupt is pending, a test is made in the micro-code Control Word stream to determine if the scan should be initiated.

Since the CPU's main function is I/O processing, and it is the nature of micro-coded programming to have vital hardware registers tied up for a number of micro-commands, interrupts can only be permitted at appropriate times. For this reason, programs that are waiting for I/O will normally enter the command word idle mode when they are ready to permit interrupt processing. Channel service (Data) interrupts and channel termination interrupts are processed in this mode by a set of standard channel service routines. If compute sequences become long in time such that they could interfere with data transfer interrupts and cause data to be lost, it is necessary to break the compute command sequences at a lessor interval to permit servicing. This is accomplished by a Branch to Permit Interrupt Entry (PIE) location. After interrupts are processed, control is returned to the compute sequence via the return after interrupt (RAI) link. Note that data service interrupts can be processed in two ways when the interrupt scanner is used: PIE-RAI linking or control word idle mode. A third way to process I/O is via the DMA type Burst Mode The frequency that PIE must be used is dependent on the throughput rate of interrupts to be processed. The return after interrupt (RAI) line location is a fixed address in ROM as is the permit interrupt entry (PIE) location. A branch to this location causes all pending interrupts to be serviced by the standard channel service routines. After all pending interrupts are serviced, control is returned via the RAI location to the current compute routine. At this time, a FLAG is set to inhibit further RAI if further interrupts are processed in the control word idle mode. Channel termination interrupts can only be processed if the control word idle mode is entered and no channel service interrupts are pending. Thus the objective of the micro-code interrupt structure is provided priority in the following order: channel service (Data), compute sequence, and channel termination.

The control word idle mode is entered by the issuance of a predetermined control word. This mode is control only when the main programming flow has reached a point where it is waiting for I/O. Entering the mode halts the execution of control words and starts the priority interrupt scanner. When a REQ (interrupt or data transfer request) or a termination is detected by the scanner, the scanner encodes an I/O service routine entry, addresses and transfers control to the I/O service routine micro-code control word stream.

I claim:

1. A data retrieval and processing system having a central processor unit, input and output control electronics interconnected to and for obtaining access to and output from the central processor unit and device controllers interconnected to said control electronics providing input to and output from the system, wherein the central processor unit is comprised of a center multiplexor;

at least one memory, storing a command sequence, the output of which is fed to the center multiplexor;

a control word address register controlled by the center multiplexor through which control words are retrieved from memory;

a memory address register controlled by the center multiplexor through which data addressing of memory is performed;

a memory address multiplexor through which the control word address register, the control word register and the memory address register obtain access to or supply data to said at least one memory;

a data register for retaining data received through said center multiplexor and connected to said at least one memory, in a recycling path back to the center multiplexor and to the input and output control electronics; and data processing means connected to the center multiplexor for performing arithmetic and other operations upon input and memory stored data, said center multiplexor both feeding and receiving inputs from said at least one memory, each of the aforesaid registers and the input and output control electronics, whereby, using internal programming stored within said at least one memory and simple input control words and data, said center multiplexor will provide internal switching between said respective aforementioned sources to provide information output.

2. The data retrieval and processing system of claim 1 in which the central processor unit includes a temporary register for retaining data received through said center multiplexor in which data from the memory address register are held for processing and a symbol register which holds an operand to be added, subtracted, or compared that is received through the center multiplexor.

3. The data retrieval and processing system of claim 2 in which the data processing means also employs suitable logic circuitry to perform programmed operations on data in the temporary and symbol registers.

4. The data retrieval and processing system of claim 2 in which a link register is provided through a connection in conjunction with logic circuitry to said temporary register and said symbol register to store the carry or borrow result of an arithmetic operation when a process command is executed.

5. The data retrieval and processing system of claim 1 in which the at least one memory includes a read-only memory for storage of a fixed program, in the form of a control word sequence which is not subject to change.

6. The data retrieval and processing system unit of claim 1 in which the at least one memory includes a modifiable storage memory.

7. The data retrieval and processing system of claim 1 in which the at least one memory includes both a read-only memory and a modifiable storage memory.

8. The data retrieval and processing system of claim 1 in which said memory address register and said control word address register provide feedback through the center multiplexor as well as through memory.

* * * * *